US012388228B2

United States Patent
Tsushima et al.

(10) Patent No.: US 12,388,228 B2
(45) Date of Patent: Aug. 12, 2025

(54) LASER DEVICE AND LEAK CHECK METHOD FOR LASER DEVICE

(71) Applicant: Gigaphoton Inc., Tochigi (JP)

(72) Inventors: Hiroaki Tsushima, Oyama (JP); Yousuke Kawagoe, Oyama (JP); Makoto Tanaka, Oyama (JP)

(73) Assignee: Gigaphoton Inc., Tochigi (JP)

( * ) Notice: Subject to any disclaimer, the term of this patent is extended or adjusted under 35 U.S.C. 154(b) by 786 days.

(21) Appl. No.: 17/686,327

(22) Filed: Mar. 3, 2022

(65) Prior Publication Data

US 2022/0190540 A1 Jun. 16, 2022

Related U.S. Application Data

(63) Continuation of application No. PCT/JP2019/039358, filed on Oct. 4, 2019.

(51) Int. Cl.
*H01S 3/00* (2006.01)
*G01M 3/04* (2006.01)
*G01M 3/32* (2006.01)
*H01S 3/036* (2006.01)
*H01S 3/225* (2006.01)

(52) U.S. Cl.
CPC .......... *H01S 3/0014* (2013.01); *G01M 3/04* (2013.01); *G01M 3/32* (2013.01); *H01S 3/036* (2013.01); *H01S 3/2251* (2013.01)

(58) Field of Classification Search
CPC ....... H01S 3/0014; H01S 3/036; H01S 3/2251
See application file for complete search history.

(56) References Cited

U.S. PATENT DOCUMENTS

| 6,819,699 B1 | 11/2004 | Enami et al. | |
|---|---|---|---|
| 2004/0160155 A1* | 8/2004 | Partlo | H01S 3/225 313/231.31 |
| 2007/0030876 A1* | 2/2007 | Levatter | H01S 3/225 372/59 |
| 2008/0056325 A1* | 3/2008 | Ohta | H01S 3/036 184/6.4 |

(Continued)

FOREIGN PATENT DOCUMENTS

| CN | 108141000 A | 6/2018 |
|---|---|---|
| DE | 4208388 A1 | 9/1993 |
| JP | H01-146565 U | 10/1989 |

(Continued)

OTHER PUBLICATIONS

An Office Action; mailed by the China National Intellectual Property Administration of the People's Republic of China on Aug. 16, 2024, which corresponds to Chinese Patent Application No. 201980099848.5 and is related to U.S. Appl. No. 17/686,327.

(Continued)

*Primary Examiner* — Michael Carter
(74) *Attorney, Agent, or Firm* — Studebaker Brackett PLLC

(57) ABSTRACT

A leak check method for a laser device includes exposing a closed space accommodating laser medium gas to the atmosphere, isolating the closed space from the atmosphere after exposing the closed space to the atmosphere, introducing neon-containing gas containing neon gas to the closed space, and determining whether or not the neon gas is leaking to outside of the closed space.

20 Claims, 9 Drawing Sheets

(56) References Cited

U.S. PATENT DOCUMENTS

2018/0241170 A1* 8/2018 Suzuki .................. H01S 3/036
2019/0173259 A1   6/2019 Asayama et al.

FOREIGN PATENT DOCUMENTS

| | | | |
|---|---|---|---|
| JP | H02-142558 U | | 12/1990 |
| JP | H09-116214 A | | 5/1997 |
| JP | H9-283821 A | | 10/1997 |
| JP | 2006-013232 A | | 1/2006 |
| JP | 2006013232 | * | 1/2006 |
| JP | 2008-270279 A | | 11/2008 |
| WO | 2017/081819 A1 | | 5/2017 |
| WO | 2018047280 A1 | | 3/2018 |

OTHER PUBLICATIONS

International Search Report issued in PCT/JP2019/039358; mailed Dec. 17, 2019.

International Preliminary Report on Patentability and Written Opinion issued in PCT/JP2019/039358; issued Apr. 5, 2022.

Search Report mailed by China National Intellectual Property Administration on Jan. 7, 2025, which corresponds to Chinese Patent Application No. 201980099848.5 and is related to U.S. Appl. No. 17/686,327.

* cited by examiner

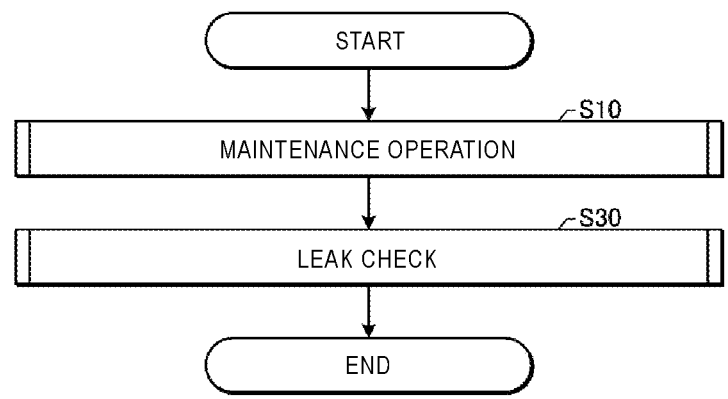
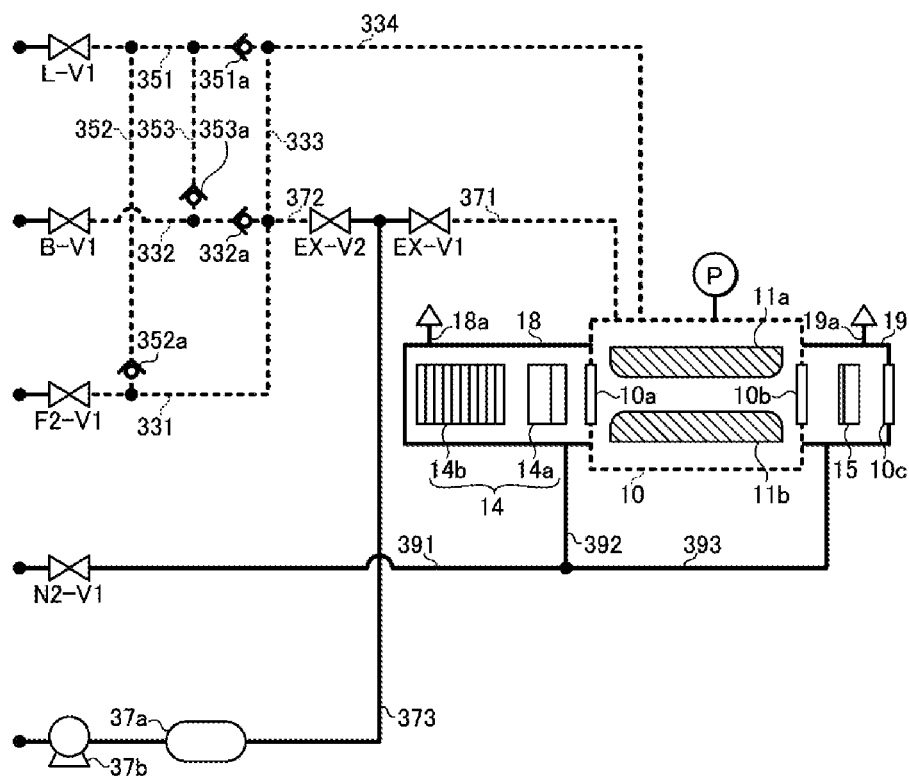

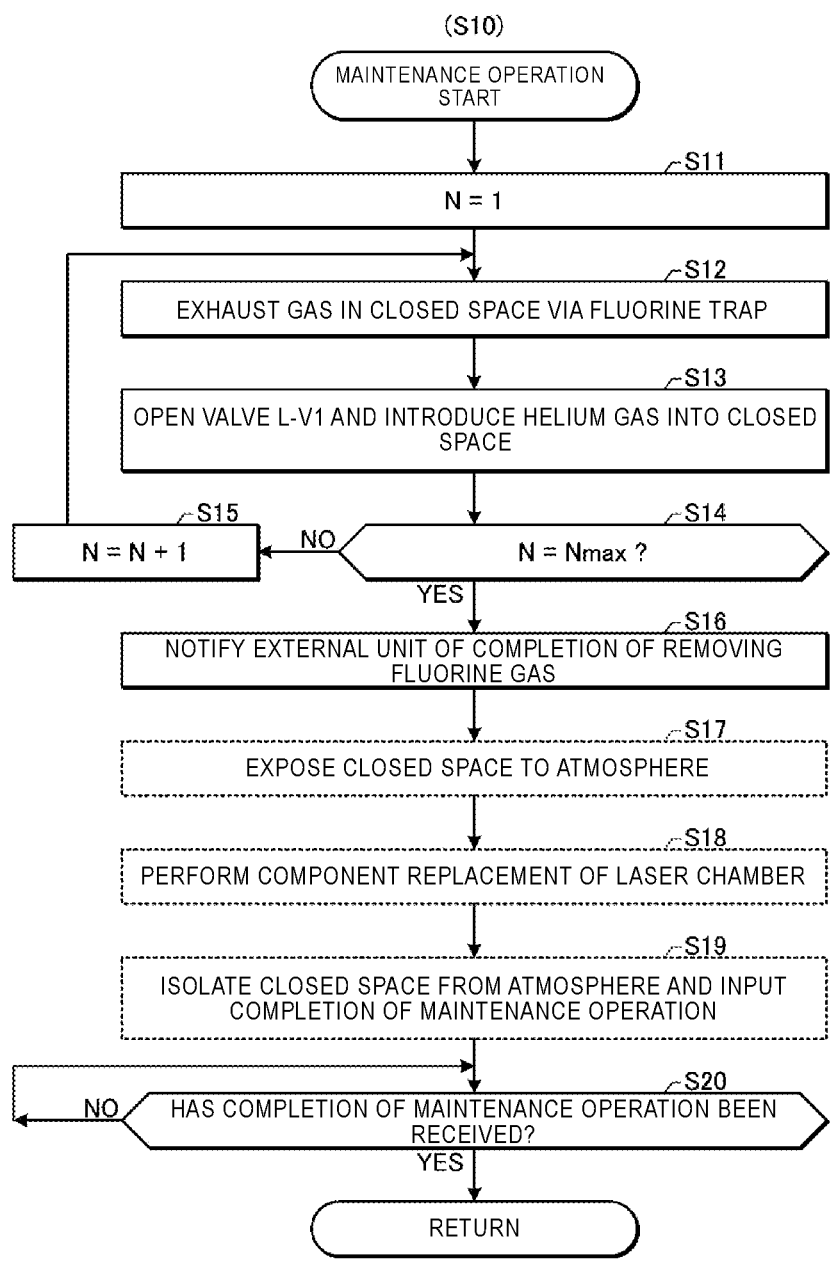

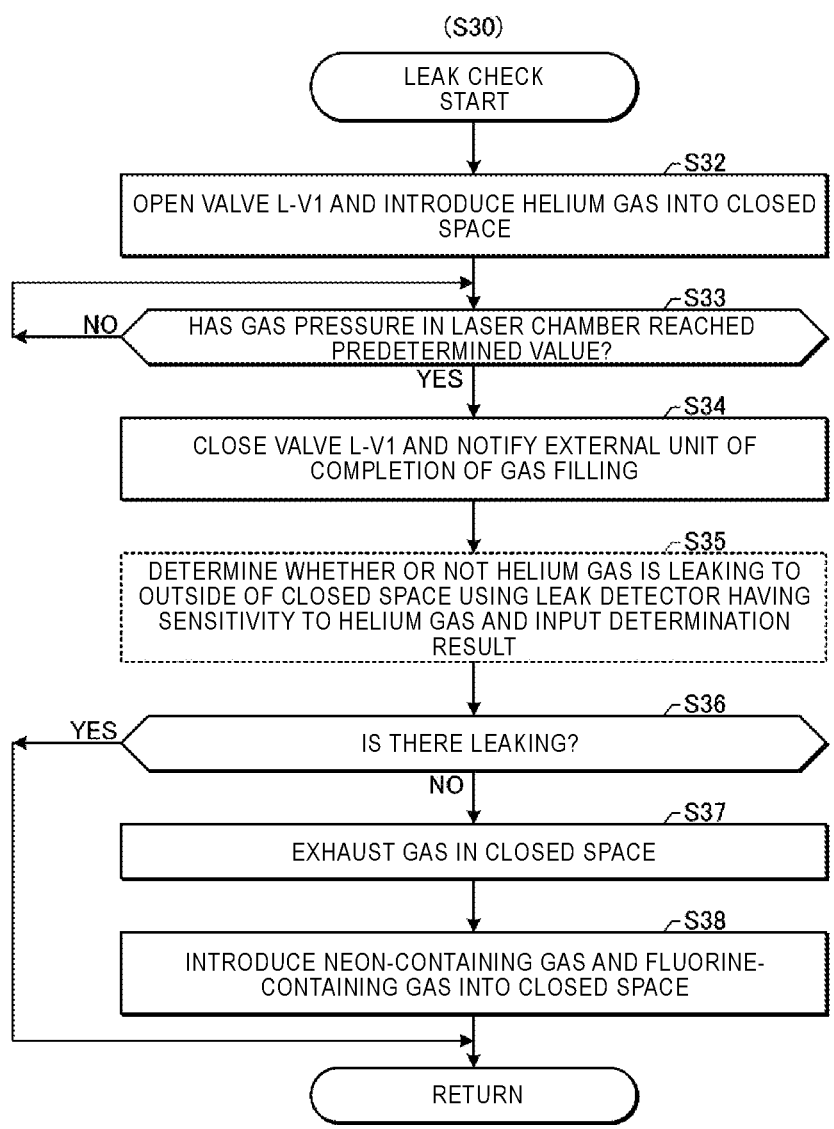

LASER DEVICE AND LEAK CHECK METHOD FOR LASER DEVICE

CROSS-REFERENCE TO RELATED APPLICATIONS

The present application claims the benefit of International Application No. PCT/JP2019/039358, filed on Oct. 4, 2019, the entire contents of which are hereby incorporated by reference.

BACKGROUND

1. Technical Field

The present disclosure relates to a laser device and a leak check method for the laser device.

2. Related Art

Recently, in a semiconductor exposure apparatus, improvement in resolution has been desired for miniaturization and high integration of semiconductor integrated circuits. For this purpose, an exposure light source that outputs light having a shorter wavelength has been developed. For example, as a gas laser device for exposure, a KrF excimer laser device for outputting laser light having a wavelength of about 248 nm and an ArF excimer laser device for outputting laser light having a wavelength of about 193 nm are used.

The KrF excimer laser device and the ArF excimer laser device each have a large spectral line width of about 350 to 400 pm in natural oscillation light. Therefore, when a projection lens is formed of a material that transmits ultraviolet rays such as KrF laser light and ArF laser light, there is a case in which chromatic aberration occurs. As a result, the resolution may decrease. Then, a spectral line width of laser light output from the gas laser device needs to be narrowed to the extent that the chromatic aberration can be ignored. For this purpose, there is a case in which a line narrowing module (LNM) including a line narrowing element (etalon, grating, and the like) is provided in a laser resonator of the gas laser device to narrow a spectral line width. In the following, a gas laser device with a narrowed spectral line width is referred to as a line narrowing gas laser device.

LIST OF DOCUMENTS

Patent Documents

Patent Document 1: Japanese Unexamined Utility Model Application Publication No. H01-146565
Patent Document 2: U.S. Pat. No. 6,819,699
Patent Document 3: Japanese Patent Application Publication No. 2008-270279
Patent Document 4: Japanese Unexamined Utility Model Application Publication No. H02-142558

SUMMARY

A leak check method for a laser device according to an aspect of the present disclosure includes exposing a closed space accommodating laser medium gas to the atmosphere, isolating the closed space from the atmosphere after exposing the closed space to the atmosphere, introducing neon-containing gas containing neon gas to the closed space, and determining whether or not the neon gas is leaking to outside of the closed space.

A leak check method for a laser device according to another aspect of the present disclosure is a leak check method for a laser device including a laser chamber, a first pipe configured to introduce first gas containing neon gas and fluorine gas into the laser chamber, and a second pipe configured to introduce second gas containing neon gas and having fluorine gas concentration lower than that of the first gas into the laser chamber. Here, the leak check method includes introducing third gas containing neon gas and having fluorine gas concentration lower than that of the first gas into a closed space including a space inside the laser chamber, and determining whether or not neon gas is leaking to outside of the closed space.

A laser device according to an aspect of the present disclosure includes a laser chamber, a first pipe configured to introduce first gas containing neon gas and fluorine gas into the laser chamber, a second pipe configured to introduce second gas containing neon gas and having fluorine gas concentration lower than that of the first gas into the laser chamber, and a third pipe configured to introduce third gas containing neon gas and having fluorine gas concentration lower than that of the first gas into the laser chamber and the first pipe.

BRIEF DESCRIPTION OF THE DRAWINGS

Embodiments of the present disclosure will be described below merely as examples with reference to the accompanying drawings.

FIG. 2 is a flowchart showing the procedure of a leak check method in a comparative example.

FIG. 3 is a diagram for explaining the range of a closed space.

FIG. 4 is a flowchart showing the procedure of maintenance operation in the comparative example.

FIG. 5 is a flowchart showing the procedure of leak check in the comparative example.

DESCRIPTION OF EMBODIMENTS

Figure 1:
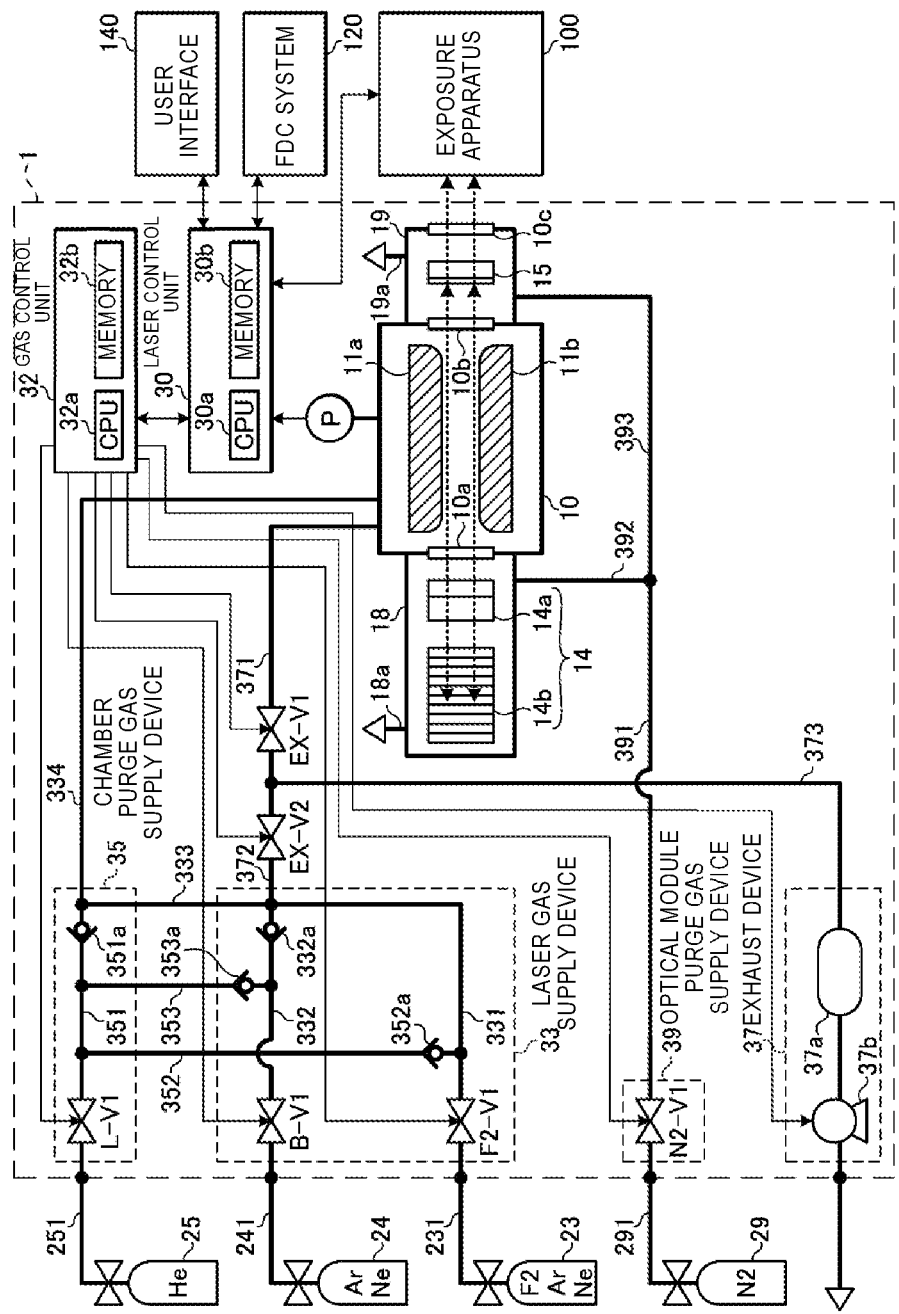
FIG. 1 schematically shows the configuration of a laser device according to a comparative example.

Content
  1. Laser Device According to Comparative Example
    1.1 Configuration
      1.1.1 Laser Oscillator and Various Control Units
      1.1.2 Various Gas Supply Devices and Exhaust Device
        1.1.2.1 Laser Gas Supply Device
        1.1.2.2 Chamber Purge Gas Supply Device
        1.1.2.3 Exhaust Device
        1.1.2.4 Optical Module Purge Gas Supply Device 1.2 Operation
   1.2.1 Operation of Laser Oscillator
   1.2.2 Operation of Optical Module Purge Gas Supply Device
   1.2.3 Leak Check Method
      1.2.3.1 Maintenance Operation
      1.2.3.2 Leak Check
1.3 Problems of Comparative Example
2. Laser Device that Performs Leak Check Using Neon-containing Gas
   2.1 Configuration
   2.2 Operation
      2.2.1 Maintenance Operation
      2.2.2 Leak Check
   2.3 Effect
3. Laser Device that Performs Leak Check Based on Change in Gas Pressure
4. Laser Device that Performs Leak Check of Replacement Laser Chamber
   4.1 Replacement Laser Chamber
   4.2 Leak Check Procedure
   4.3 Effect
5. Others Hereinafter, embodiments of the present disclosure will be described in detail with reference to the drawings. The embodiments described below show some examples of the present disclosure and do not limit the contents of the present disclosure. Also, all configurations and operation described in the embodiments are not necessarily essential as configurations and operation of the present disclosure. Here, the same components are denoted by the same reference numerals, and duplicate description thereof is omitted.

1. Laser Device According to Comparative Example 1.1 Configuration

FIG. 1 schematically shows the configuration of a laser device 1 according to a comparative example. The laser device 1 is used together with an exposure apparatus 100.

The laser device 1 includes a laser chamber 10, a line narrowing module 14, an output coupling mirror 15, a laser control unit 30, and a gas control unit 32. The line narrowing module 14 and the output coupling mirror 15 configure a laser resonator. The laser device 1 further includes a laser gas supply device 33, a chamber purge gas supply device 35, an exhaust device 37, and an optical module purge gas supply device 39.

1.1.1 Laser Oscillator and Various Control Units

The laser chamber 10 is arranged in the optical path of the laser resonator. The laser chamber 10, the laser resonator, and a high-voltage power source (not shown) constitute a laser oscillator.

The laser chamber 10 is provided with two windows 10a, 10b. The laser chamber 10 accommodates a pair of electrodes 11a, 11b, and further a laser medium gas. The laser medium gas includes halogen gas, rare gas, and buffer gas. For example, the halogen gas is fluorine gas, the rare gas is argon gas or krypton gas, and the buffer gas is neon gas. Further, the laser medium gas may include xenon gas as additive gas. The laser chamber 10 is connected to a pressure gauge P.

The line narrowing module 14 includes wavelength selection elements such as a prism 14a and a grating 14b. The line narrowing module 14 is accommodated in a housing 18. The output coupling mirror 15 is configured by a partial reflection mirror. The output coupling mirror 15 is accommodated in a housing 19. The housing 19 is provided with a window 10c. The housing 19 may further accommodate an energy monitor (not shown) for measuring the pulse energy of pulse laser light.

The laser control unit 30 is configured by a computer unit including a central processing unit (CPU) 30a and a memory 30b. The memory 30b stores programs and data necessary for information processing. The CPU 30a is configured to read out various kinds of data and perform information processing in accordance with the programs stored in the memory 30b. The laser control unit 30 is connected to an exposure apparatus control unit (not shown) of the exposure apparatus 100, a fault detection and classification (FDC) system 120, and a user interface 140.

The gas control unit 32 is configured by a computer unit including a CPU 32a and a memory 32b. The memory 32b stores programs and data necessary for information processing. The CPU 32a is configured to read out various kinds of data and perform information processing in accordance with the programs stored in the memory 32b.

1.1.2 Various Gas Supply Devices and Exhaust Device

Next, the laser gas supply device 33, the chamber purge gas supply device 35, the exhaust device 37, and the optical module purge gas supply device 39 will be described. In the following description, a first end of each pipe through which gas flows is the end on the upstream side of the gas flow, and a second end thereof is the end on the opposite side of the first end.

1.1.2.1 Laser Gas Supply Device

The laser gas supply device 33 includes a valve F2-V1 arranged in the vicinity of a first end of a pipe 331 and a valve B-V1 arranged in the vicinity of a first end of a pipe 332. The pipe 331 corresponds to the first pipe in the present disclosure. The pipe 332 corresponds to the second pipe in the present disclosure.

A first end of the pipe 331 is connected to a fluorine-containing gas cylinder 23 via a pipe 231. The fluorine-containing gas cylinder 23 corresponds to the first gas supply source in the present disclosure. The fluorine-containing gas cylinder 23 stores fluorine-containing gas containing neon gas and fluorine gas. The fluorine-containing gas corresponds to the first gas in the present disclosure. The fluorine-containing gas is, for example, mixed gas of fluorine gas, argon gas, and neon gas.

The first end of the pipe 332 is connected to a neon-containing gas cylinder 24 via a pipe 241. The neon-containing gas cylinder 24 corresponds to the second gas supply source in the present disclosure. The neon-containing gas cylinder 24 stores neon-containing gas containing neon gas and having fluorine gas concentration lower than that of the fluorine-containing gas. The neon-containing gas corresponds to the second gas in the present disclosure. The neon-containing gas may not contain fluorine gas. The neon-containing gas is, for example, mixed gas of argon gas, neon gas, and xenon gas.

Alternatively, the fluorine-containing gas may be mixed gas of fluorine gas, krypton gas, and neon gas, and the neon-containing gas may be mixed gas of krypton gas and neon gas.

A second end of the pipe 331 and a second end of the pipe 332 are connected to each other and are further connected to a pipe 333. The pipe 333 is connected to a pipe 334, and the pipe 334 is connected to the laser chamber 10. A check valve 332a for suppressing backflow of the fluorine-containing gas from the pipe 331 and the pipe 333 is arranged in the vicinity of the second end of the pipe 332. Each of the pipes 331, 332 may be provided with a mass flow controller (not shown).

1.1.2.2 Chamber Purge Gas Supply Device

The chamber purge gas supply device 35 includes a valve L-V1 arranged in the vicinity of a first end of a pipe 351. The first end of the pipe 351 is connected to a helium gas cylinder 25 via a pipe 251. A second end of the pipe 351 is connected to a connection portion between the pipe 333 and the pipe 334. A check valve 351a for suppressing backflow of the fluorine-containing gas and the neon-containing gas from the pipe 333 and the pipe 334 is arranged in the vicinity of the second end of the pipe 351.

A first end of a pipe 352 is connected to the pipe 351 between the valve L-V1 and the check valve 351a. A second end of the pipe 352 is connected to the pipe 331. A check valve 352a for suppressing backflow of the fluorine-containing gas from the pipe 331 is arranged in the vicinity of the second end of the pipe 352.

A first end of a pipe 353 is connected to the pipe 351 between the valve L-V1 and the check valve 351a. A second end of the pipe 353 is connected to the pipe 332. A check valve 353a for suppressing backflow of the neon-containing gas from the pipe 332 is arranged in the vicinity of the second end of the pipe 353.

1.1.2.3 Exhaust Device

The exhaust device 37 includes a fluorine trap 37a and an exhaust pump 37b arranged at a pipe 373. The fluorine trap 37a contains a processing agent for capturing fluorine gas and fluorine compounds. The exhaust pump 37b is configured to forcibly exhaust gas having passed through the fluorine trap 37a. The pipe 373 may include a bypass flow path (not shown) that bypasses the exhaust pump 37b to discharge the gas having passed through the fluorine trap 37a when the gas pressure in the laser chamber 10 is higher than atmospheric pressure.

A first end of the pipe 373 is connected to a second end of a pipe 371 and a second end of a pipe 372. The first end of the pipe 371 is connected to the laser chamber 10. A valve EX-V1 is arranged at the pipe 371. A first end of the pipe 372 is connected to a connection portion between the pipe 331 and the pipe 332. A valve EX-V2 is arranged at the pipe 372.

1.1.2.4 Optical Module Purge Gas Supply Device

The optical module purge gas supply device 39 includes a valve N2-V1 arranged in the vicinity of a first end of a pipe 391. The first end of the pipe 391 is connected to a nitrogen gas cylinder 29 via a pipe 291. A second end of the pipe 391 is branched into a pipe 392 and a pipe 393. The pipe 392 is connected to the housing 18 that accommodates the line narrowing module 14. The pipe 393 is connected to the housing 19 that accommodates the output coupling mirror 15. Each of the pipes 392, 393 may be provided with a mass flow controller (not shown).

1.2 Operation

1.2.1 Operation of Laser Oscillator

The laser control unit 30 transmits a trigger signal to a high-voltage power source (not shown) in accordance with a control signal from the exposure apparatus control unit. The high-voltage power source generates a pulse high voltage in accordance with the trigger signal, and applies the high voltage between the electrodes 11a, 11b.

When the high voltage is applied between the electrodes 11a, 11b, discharge occurs between the electrodes 11a, 11b. The laser medium gas in the laser chamber 10 is excited by the energy of the discharge and shifts to a high energy level. When the excited laser medium gas then shifts to a low energy level, light having a wavelength corresponding to the difference between the energy levels is emitted.

The light generated in the laser chamber 10 is output to the outside of the laser chamber 10 through the windows 10a, 10b. The light output from the window 10a is line-narrowed by the line narrowing module 14, and light having wavelength close to the desired wavelength is returned to the laser chamber 10 through the window 10a.

The output coupling mirror 15 transmits and outputs a part of the light output from the window 10b, and reflects the other parts back into the laser chamber 10 through the window 10b.

In this way, the light output from the laser chamber 10 reciprocates between the line narrowing module 14 and the output coupling mirror 15. This light is amplified every time it passes through a discharge space between the discharge electrodes 11a, 11b. Further, the light is line-narrowed each time being turned back in the line narrowing module 14. Thus, the light having undergone laser oscillation and line narrowing is output as pulse laser light from the laser resonator through the output coupling mirror 15 and output from the laser device 1 through the window 10c.

Pulse laser light output from the laser device 1 is incident on the exposure apparatus 100.

1.2.2 Operation of Optical Module Purge Gas Supply Device

When the laser device 1 is in operation, the optical module purge gas supply device 39 introduces nitrogen gas into the housings 18, 19. At this time, the valve N2-V1 is opened, and the valves F2-V1, B-V1, L-V1, EX-V1, EX-V2 are closed.

The introduced amount of the nitrogen gas may be controlled by the mass flow controller (not shown) arranged at each of the pipes 392, 393. The nitrogen gas stays in the housings 18, 19, and is then exhausted from exhaust ports 18a, 19a. By introducing the nitrogen gas into the housings 18, 19, contamination of the optical elements in the housings 18, 19 is suppressed.

1.2.3 Leak Check Method

FIG. 2 is a flowchart showing the procedure of a leak check method in the comparative example. The leak check method is performed in the order of maintenance operation (S10) and leak check (S30).

The maintenance operation (S10) includes exposing a closed space accommodating the laser medium gas to the atmosphere, then performing component replacement of the laser chamber 10, and then isolating the closed space from the atmosphere.

The leak check (S30) includes introducing helium gas into the closed space isolated from the atmosphere, and then determining whether or not the helium gas is leaking to the outside of the closed space.

FIG. 3 is a diagram for explaining the range of the closed space. FIG. 3 shows the laser chamber 10 and various pipes in the laser device 1 shown in FIG. 1, and shows the range of the laser chamber 10 and the pipes, which form the closed space, by broken lines. The closed space includes a part of the space inside each of the pipes 331, 332, 351, 371, 372, the space inside each of the pipes 333, 334, 352, 353, and the space inside the laser chamber 10.

1.2.3.1 Maintenance Operation

FIG. 4 is a flowchart showing the procedure of the maintenance operation in the comparative example. The flowchart of FIG. 4 corresponds to the subroutine of S10 in FIG. 2. In the procedure shown in FIG. 4, steps each surrounded by a solid line frame indicate operation of the gas control unit 32, and steps each surrounded by a broken line frame indicate operation of an operator.

In the maintenance of the laser chamber 10, fluorine gas in the closed space is removed by the following process before the closed space is exposed to the atmosphere.

In S11, the gas control unit 32 sets the value of a counter N for counting the number of repetitions of gas exhaust to an initial value 1.

In S12, the gas control unit 32 exhausts the gas in the closed space via the fluorine trap 37a. Specifically, the valves EX-V1, EX-V2 are opened while the valves F2-V1, B-V1, L-V1 are kept closed. Thus, the gas in the laser chamber 10 flows to the exhaust device 37 via the valve EX-V1, and the gas in the pipes 331, 332, 333, 334, 351, 352, 353 flow to the exhaust device 37 via the valve EX-V2. In the exhaust device 37, the fluorine trap 37a captures the fluorine gas and the fluorine compounds. The gas having passed through the fluorine trap 37a is exhausted to the outside of the laser device 1 via the exhaust pump 37b or the bypass flow path (not shown). When the exhaust pump 37b is driven, the exhaust can be performed so that the gas pressure in the closed space is lower than the atmospheric pressure.

In S13, the gas control unit 32 introduces the helium gas into the closed space. Specifically, while the valves F2-V1, B-V1 are kept closed, the driving of the exhaust pump 37b is stopped, and then the valves EX-V1, EX-V2 are closed and the valve L-V1 is opened. Thus, the helium gas is introduced from the pipe 351 into the laser chamber 10 via the pipes 352, 353, 331, 332, 333, 334. The helium gas is also introduced into a part of the pipes 371, 372. Thus, gas purge of the closed space by the helium gas is performed. After the introduction of the helium gas, the gas control unit 32 closes the valve L-V1.

In S14, the gas control unit 32 determines whether or not the value of the counter N has reached a predetermined value Nmax. The predetermined value Nmax is an integer is equal to or larger than 2.

When the value of the counter N has not reached the predetermined value Nmax (S14: NO), the gas control unit 32 advances processing to S15. In S15, the gas control unit 32 updates the value of N by adding 1 to the value of the counter N. After S15, the gas control unit 32 returns processing to S12. By repeating the gas exhaust and the introduction of the helium gas a plurality of times, fluorine gas in the closed space including the space inside the laser chamber 10 is removed to a concentration allowing exposure to the atmosphere.

When the value of the counter N has reached the predetermined value Nmax (S14: YES), the gas control unit 32 advances processing to S16.

In S16, the gas control unit 32 notifies an external unit of the completion of removing fluorine gas. For example, the gas control unit 32 transmits a signal indicating the completion of removing fluorine gas to the laser control unit 30. Triggered by the signal, the laser control unit 30 transmits a notification indicating the completion of removing fluorine gas to the FDC system 120. In addition to the notification to the FDC system 120, or in place of the notification to the FDC system 120, the laser control unit 30 causes the user interface 140 to display an indication that removing of the fluorine gas is completed.

In S17, the operator causes the closed space to be exposed to the atmosphere to perform component replacement of the laser chamber 10. For example, when the window 10a or 10b is to be replaced, at least a part of the space inside the laser chamber 10 is exposed to the atmosphere. Alternatively, for example, when the laser chamber 10 itself is to be replaced, a part of the pipes 334, 371 and the like connected to the laser chamber 10 is also exposed to the atmosphere. In S18, the operator performs component replacement of the laser chamber 10.

In S19, the operator isolates the closed space from the atmosphere and inputs completion of the maintenance operation using the user interface 140. The laser control unit 30 receives the signal input to the user interface 140 and transmits a signal indicating the completion of the maintenance operation to the gas control unit 32.

In S20, the gas control unit 32 determines whether or not the signal indicating the completion of the maintenance operation has been received. When the signal indicating the completion of the maintenance operation has not been received (S20: NO), the gas control unit 32 waits until the signal indicating the completion of the maintenance operation is received. When the signal indicating the completion of the maintenance operation has been received (S20: YES), the gas control unit 32 ends the processing of the present flowchart and returns to processing shown in FIG. 2.

1.2.3.2 Leak Check

FIG. 5 is a flowchart showing the procedure of the leak check in the comparative example. The flowchart of FIG. 5 corresponds to the subroutine of S30 in FIG. 2. In the procedure shown in FIG. 5, steps each surrounded by a solid line frame indicate operation of the gas control unit 32, and steps each surrounded by a broken line frame indicate operation of the operator.

In S32, the gas control unit 32 opens the valve L-V1 and introduces the helium gas into the closed space. At this time, the valves F2-V1, B-V1, EX-V1, EX-V2 are closed.

In S33, the gas control unit 32 determines whether or not the gas pressure in the laser chamber 10 measured by the pressure gauge P has reached a predetermined value. When the gas pressure in the laser chamber 10 has not reached the predetermined value (S33: NO), the gas control unit 32 waits until the gas pressure in the laser chamber 10 reaches the predetermined value. When the gas pressure in the laser chamber 10 has reached the predetermined value (S33: YES), the gas control unit 32 advances processing to S34.

In S34, the gas control unit 32 closes the valve L-V1 and notifies an external unit of the completion of gas filling. For example, the gas control unit 32 transmits a signal indicating completion of gas filling to the laser control unit 30, and the laser control unit 30 transmits a notification indicating completion of gas filling to the FDC system 120 and/or causes the user interface 140 to display an indication that gas filling is completed.

In S35, the operator uses a helium leak detector (not shown) to determine whether or not the helium gas is leaking to the outside of the closed space. For example, when the window 10a or 10b has been replaced, it is checked whether or not the helium gas is leaking around the replaced window. Thereafter, the operator inputs the determination result using the user interface 140. The laser control unit 30 receives the signal input to the user interface 140 and transmits a signal indicating the determination result to the gas control unit 32. Alternatively, a signal indicating the determination result is transmitted from the helium leak detector to the laser control unit 30, and the laser control unit 30 may transmit the signal to the gas control unit 32.

In S36, the gas control unit 32 identifies whether or not the helium gas is leaking to the outside of the closed space.

When the helium gas is leaking to the outside of the closed space (S36: YES), the gas control unit 32 terminates the processing of the present flowchart and returns to processing shown in FIG. 2. At this time, the gas control unit 32 may transmit a signal indicating a device error to the laser control unit 30. The laser control unit 30 transmits a notification indicating the device error to the FDC system 120 and/or causes the user interface 140 to display an indication of the device error.

When the helium gas does not leak to the outside of the closed space (S36: NO), the gas control unit 32 advances processing to S37. In S37, the gas control unit 32 exhausts the gas in the closed space. The exhaust procedure may be similar to that described in S12 of FIG. 4. Thereafter, in S38, the gas control unit 32 introduces the neon-containing gas and the fluorine-containing gas into the closed space including the space inside the laser chamber 10. Specifically, first, the valves EX-V1, EX-V2, F2-V1, L-V1 are closed and the valve B-V1 is opened. Thus, the neon-containing gas is introduced from the pipe 332 into the laser chamber 10. Next, the valves EX-V1, EX-V2, B-V1, L-V1 are closed and the valve F2-V1 is opened. Thus, the fluorine-containing gas is introduced from the pipe 331 into the laser chamber 10.

When the gas pressure and fluorine gas concentration in the laser chamber 10 reaches a desired value, the gas control unit 32 closes the valves EX-V1, EX-V2, F2-V1, B-V1, L-V1 and transmits a signal indicating completion of the operation preparation of the laser device 1 to the laser control unit 30.

Alternatively, in order to stabilize gas composition in the laser chamber 10, the signal indicating completion of the operation preparation of the laser device 1 may be transmitted to the laser control unit 30 after repeating the exhaust in S37 and the gas introduction in S38 a plurality of times.

After S38, the gas control unit 32 terminates the processing of the present flowchart and returns to processing shown in FIG. 2.

1.3 Problems of Comparative Example

In the comparative example, the gas purge of the closed space and the leak check are performed using helium gas. However, since helium gas has a limited production area and a limited production amount, there may be a case that procuring helium gas becomes difficult or the price thereof rises. If the procurement of helium gas is stopped, there is a possibility that the maintenance of the laser device 1 cannot be performed and the laser device 1 cannot be operated.

2. Laser Device that Performs Leak Check Using Neon-Containing Gas 2.1 Configuration A first embodiment will be described with reference to FIGS. 6 to 8.

Figure 6:
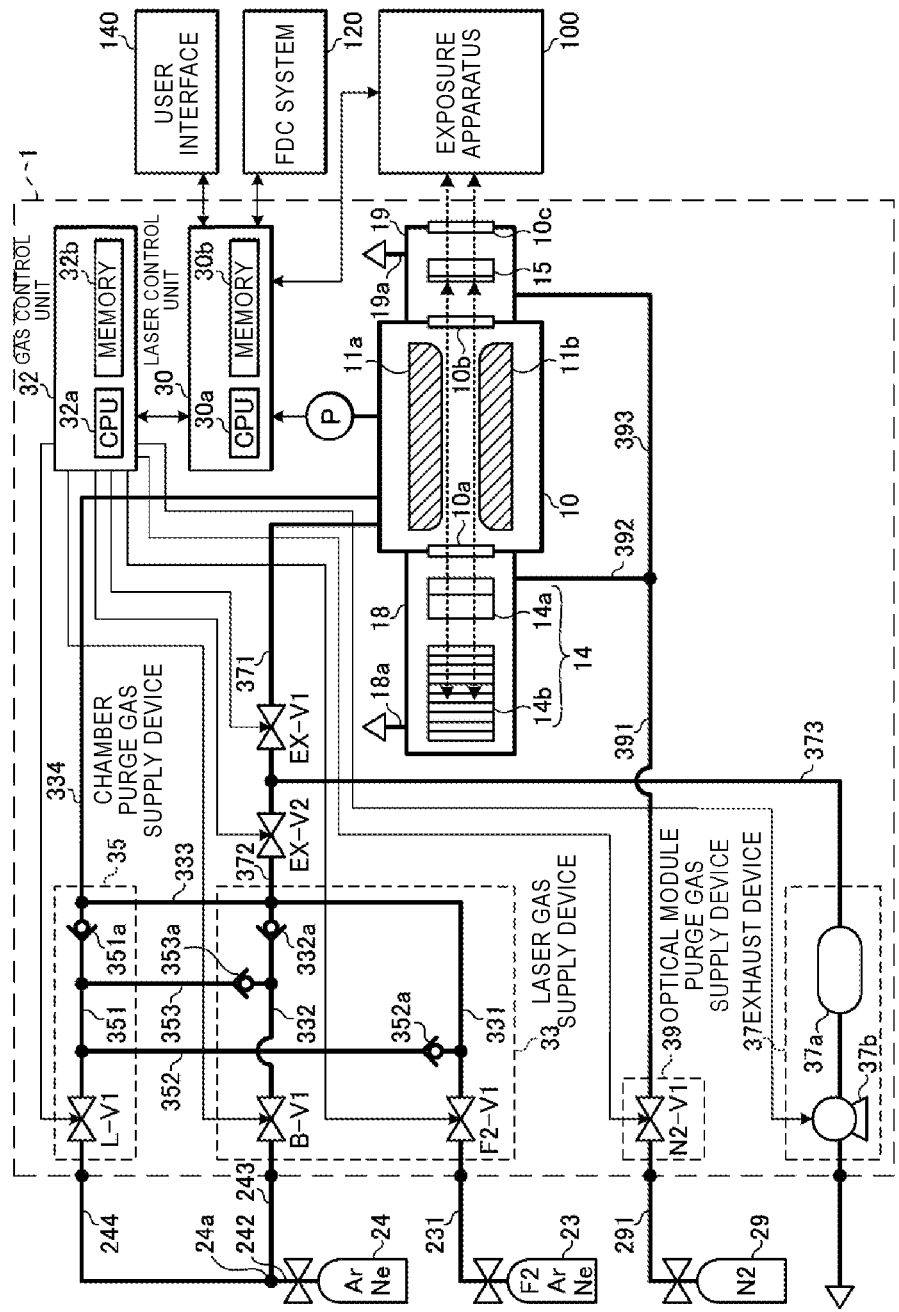
FIG. 6 schematically shows the configuration of the laser device according to a first embodiment.

FIG. 6 schematically shows the configuration of the laser device 1 according to the first embodiment. In the first embodiment, the helium gas cylinder 25 may be omitted. The pipe 351 is configured to introduce third gas containing neon gas and having fluorine gas concentration lower than that of the fluorine-containing gas into the laser chamber 10 and the pipes 331, 332. The pipe 351 corresponds to the third pipe in the present disclosure.

The third gas is preferably gas having the same composition as that of the neon-containing gas. The gas having the same composition refers to gas in which both the components and the mixing ratio thereof are the same. More preferably, the first end of the pipe 351 is connected to the neon-containing gas cylinder 24. A pipe 242 is connected to the neon-containing gas cylinder 24. The pipe 242 is branched into a pipe 243 and a pipe 244 at a branch portion 24a. The pipe 243 is connected to the first end of the pipe 332 and the pipe 244 is connected to the first end of the pipe 351. The pipes 242, 243, 244 correspond to the fourth pipe in the present disclosure.

In other respects, the configuration of the first embodiment is similar to the configuration of the comparative example.

2.2 Operation

The operation of the laser oscillator and the operation of the optical module purge gas supply device 39 in the first embodiment are similar to those described in the above comparative example. The leak check method of the first embodiment is performed in the procedure similar to that described with reference to FIG. 2. However, a subroutine described below differs between the first embodiment and the comparative example.

2.2.1 Maintenance Operation

Figure 7:
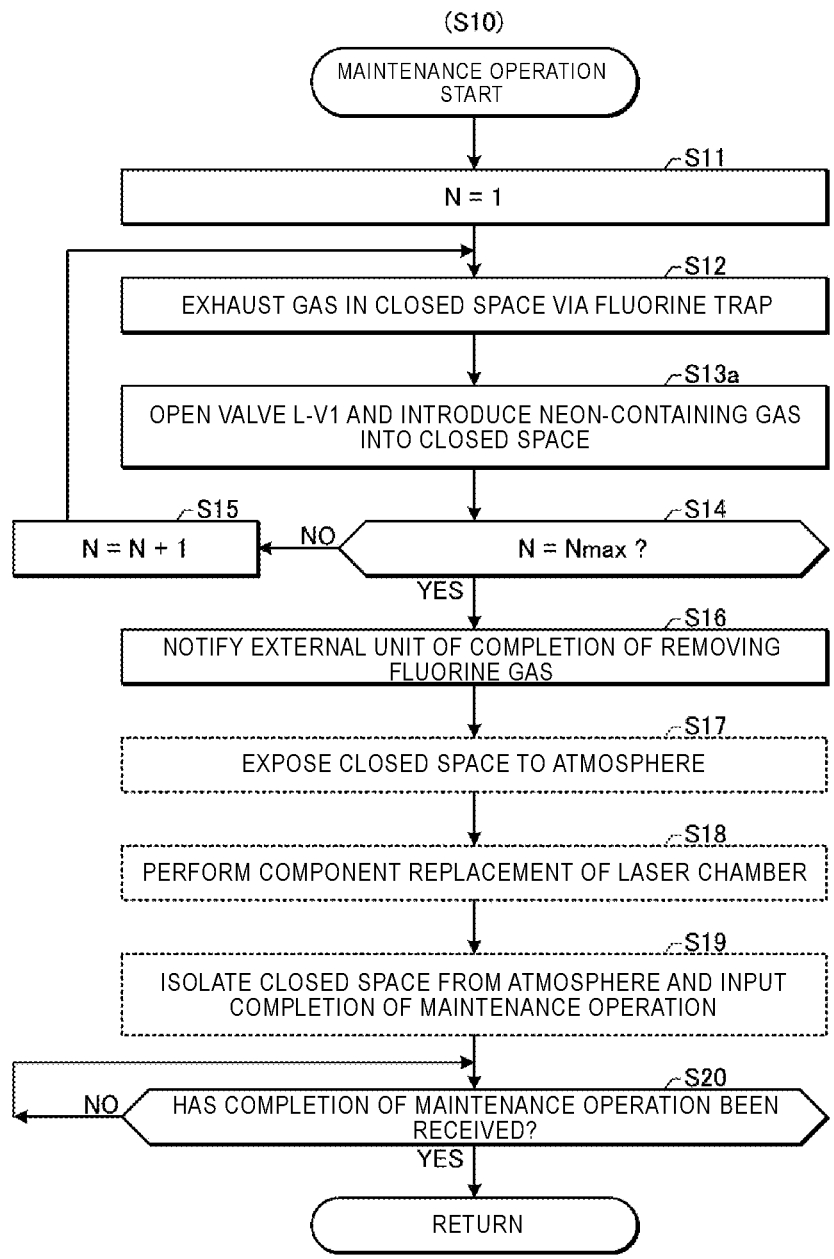
FIG. 7 is a flowchart showing the procedure of the maintenance operation in the first embodiment.

FIG. 7 is a flowchart showing the procedure of the maintenance operation in the first embodiment. Instead of S13 of FIG. 4, in S13a of FIG. 7, the gas control unit 32 introduces the neon-containing gas into the closed space.

In other respects, the processing of FIG. 7 is similar to the processing in the comparative example described with reference to FIG. 4.

2.2.2 Leak Check

Figure 8:
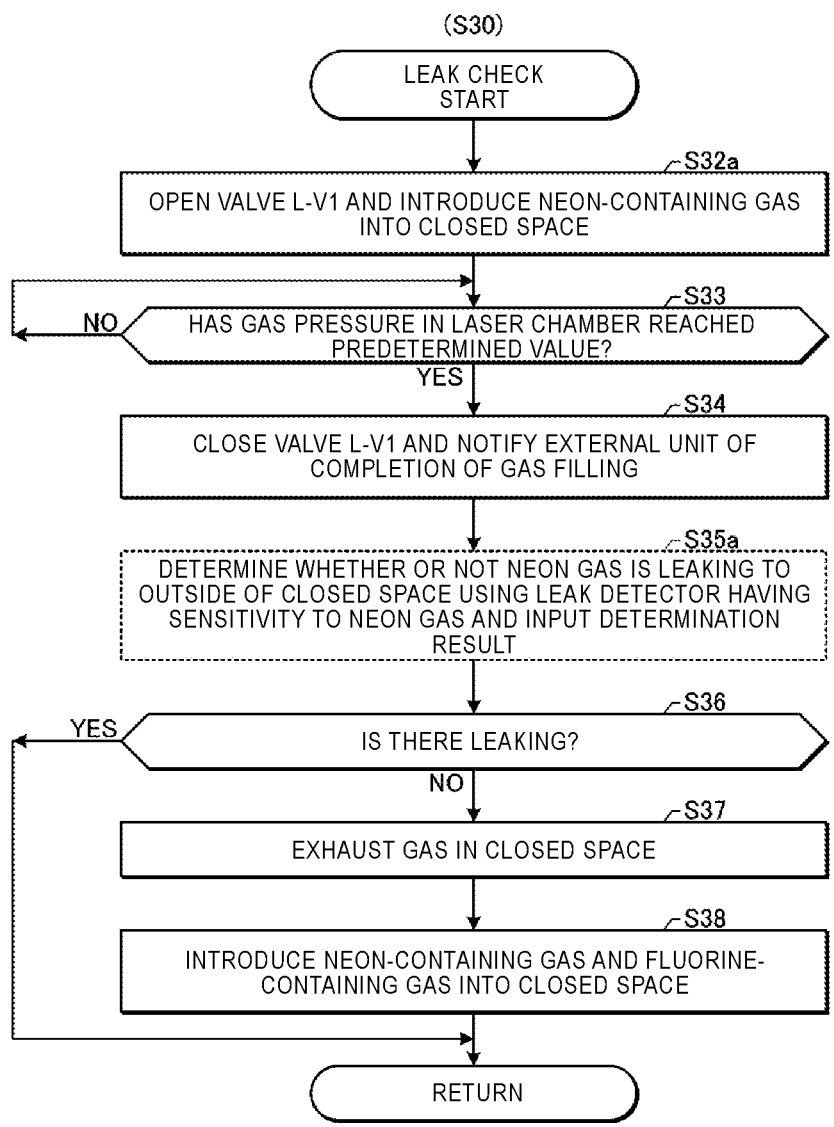
FIG. 8 is a flowchart showing the procedure of the leak check in the first embodiment.

FIG. 8 is a flowchart showing the procedure of the leak check in the first embodiment. Instead of S32 of FIG. 5, in S32a of FIG. 8, the gas control unit 32 introduces the neon-containing gas into the closed space. Further, instead of S35 of FIG. 5, in S35a of FIG. 8, the operator determines whether or not neon gas is leaking to the outside of the closed space using a leak detector (not shown) having sensitivity to neon gas. For example, when neon gas exceeding a predetermined threshold value is detected, it is determined that neon gas is leaking to the outside of the closed space. The leak detector having sensitivity to neon gas may be, for example, a device that detects neon gas by detecting a difference in thermal conductivity between reference gas and gas to be measured. The leak detector may be configured to output an indication or alarm based on the detected amount of neon gas.

In other respects, the processing of FIG. 8 is similar to the processing in the comparative example described with reference to FIG. 5.

2.3 Effect (1) According to the first embodiment, neon-containing gas containing neon gas is introduced into the closed space (S32a of FIG. 8), and it is determined whether or not neon gas is leaking to the outside of the closed space (S35a of FIG. 8). Thus, since the leak check can be performed without using helium gas, even in a case that helium gas becomes difficult to be procured, it is possible to prevent the operation of the laser device 1 from being stopped due to maintenance impossibility.

(2) According to the first embodiment, prior to exposing the closed space to the atmosphere, gas in the closed space is exhausted via the fluorine trap 37a (S12 of FIG. 7), neon-containing gas is introduced into the closed space (S13a of FIG. 7), and gas in the closed space is exhausted again via the fluorine trap 37a (S12 of FIG. 7). Thus, the inside of the closed space can be gas-purged and the fluorine gas concentration can be reduced without using helium gas. Further, since the gas purge is performed using the same neon-containing gas as the gas used for the leak check, an increase in the number of pipes is suppressed.

(3) According to the first embodiment, a leak detector having sensitivity to neon gas is used to determine whether or not neon gas is leaking to the outside of the closed space (S35a of FIG. 8). Thus, the leak check can be performed immediately after neon-containing gas is introduced into the laser chamber 10.

(4) According to the first embodiment, when it is determined that neon gas is not leaking to the outside of the closed space, gas in the closed space is exhausted (S37 of FIG. 8), and neon-containing gas and fluorine-containing gas are introduced into the closed space (S38 of FIG. 8). Thus, since it is determined in advance that neon gas is not leaking, it is possible to suppress the leakage of fluorine gas when fluorine-containing gas and the like is introduced. Further, when the leak check is performed using neon-containing gas, the number of times of repeating the exhaust in S37 and the gas introduction in S38 can be reduced as compared with the case in which the leak check is performed using helium gas.

(5) According to the first embodiment, the laser device 1 includes the pipe 331 for introducing fluorine-containing gas containing neon gas and fluorine gas into the laser chamber 10, the pipe 332 for introducing neon-containing gas containing neon gas and having the fluorine gas concentration lower than that of the fluorine-containing gas into the laser chamber 10, and the pipe 351 for introducing the third gas containing neon gas and having the fluorine gas concentration lower than that of the fluorine-containing gas into the laser chamber 10 and the pipe 331. Thus, since the leak check can be performed using the third gas containing neon gas and without using helium gas, even in a case that helium gas becomes difficult to be procured, it is possible to prevent the operation of the laser device 1 from being stopped due to maintenance impossibility.

Although the case in which the third gas is introduced via the pipe 351 has been described, the present disclosure is not limited thereto. Even without the pipe 351, the third gas having the same composition as the neon-containing gas may be introduced via the pipe 332.

(6) According to the first embodiment, the pipe 351 introduces the third gas having the same composition as that of the neon-containing gas into the laser chamber 10 and the pipe 331. Thus, since the neon-containing gas constituting the laser medium gas can be diverted as the third gas for the leak check, the number of procured items of gas can be reduced. In addition, the cost of pipe work for the third gas can be reduced.

(7) According to the first embodiment, the pipe 331 is connected to the fluorine-containing gas cylinder 23 storing fluorine-containing gas, and the pipes 332, 351 are connected to the neon-containing gas cylinder 24 storing neon-containing gas.

Further, according to the first embodiment, the pipes 242, 243, 244 including the branch portion 24a are connected to between the pipes 332, 351 and the neon-containing gas cylinder 24.

Thus, the gas cylinder connected to the pipes 332, 351 can be used in common. In addition, the pipe for helium gas is not required, and the cost of pipe work can be reduced.

(8) According to the first embodiment, the pipe 351 introduces the third gas into the laser chamber 10 and the pipes 331, 332. Thus, the leak check can be performed not only for the laser chamber 10 but for the pipes 331, 332 and the like at the same time.

(9) According to the first embodiment, the laser device 1 includes the exhaust device 37 that exhausts gas from the laser chamber 10 and the pipe 331. Thus, the leak check can be performed for the exhausted laser chamber 10 and pipe 331 into which the third gas is introduced.

(10) According to the first embodiment, the laser device 1 includes the exhaust device 37 that exhausts gas from the laser chamber 10 and the pipes 331, 332. Thus, the leak check can be performed for the exhausted laser chamber 10 and pipes 331, 332 into which the third gas is introduced.

3. Laser Device that Performs Leak Check Based on Change in Gas Pressure

A second embodiment will be described with reference to FIG. 9. The configuration of the second embodiment is similar to that of the first embodiment. The operation of the second embodiment is different from that of the first embodiment in a leak check subroutine described below.

Figure 9:
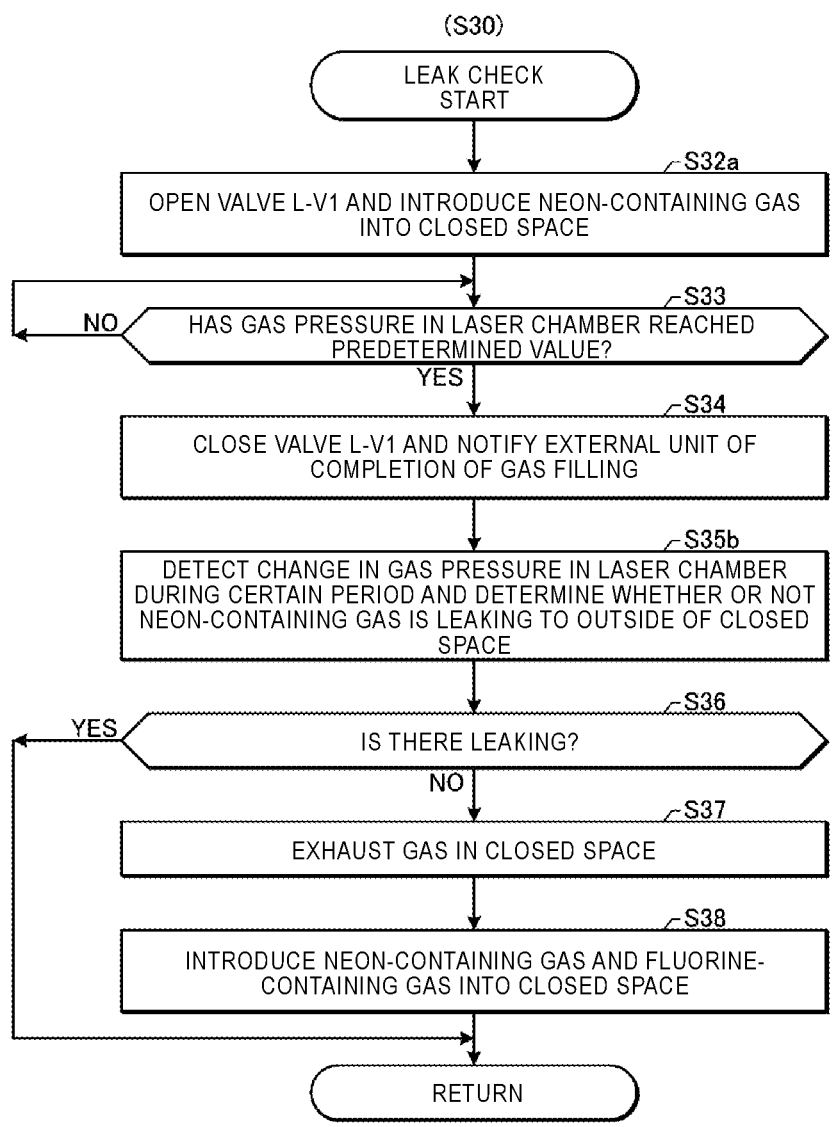
FIG. 9 is a flowchart showing the procedure of the leak check in a second embodiment.

FIG. 9 is a flowchart showing the procedure of the leak check in the second embodiment. Instead of S35a of FIG. 8, in S35b of FIG. 9, the gas control unit 32 determines whether or not the neon-containing gas is leaking to the outside of the closed space by detecting the change of the gas pressure in the laser chamber 10 during a certain period T.

For example, the gas control unit 32 receives gas pressure P1 in the laser chamber 10 measured by the pressure gauge P from the laser control unit 30, and further receives gas pressure P2 when the certain period T has elapsed from the laser control unit 30. Then, the gas control unit 32 calculates the following value ΔP or dP/dT.

$$\Delta P = |P1 - P2|$$

$$dP/dT = |P1 - P2|/T$$

When ΔP is equal to or smaller than a predetermined threshold value or when dP/dT is equal to or smaller than a predetermined threshold value, the gas control unit 32 determines that the neon-containing gas is not leaking to the outside of the closed space. When ΔP is larger than the predetermined threshold value or when dP/dT is larger than the predetermined threshold value, the gas control unit 32 determines that the neon-containing gas is leaking to the outside of the closed space.

In other respects, the operation of the second embodiment is similar to that of the first embodiment.

According to the second embodiment, it is determined whether or not the neon-containing gas is leaking to the outside of the closed space (S35b of FIG. 9) by detecting the change of gas pressure in the closed space. This makes it possible to automate the leak check and to reduce the workload of the operator.

4. Laser Device that Performs Leak Check of Replacement Laser Chamber

A third embodiment will be described with reference to FIGS. 10 and 11. The configuration of the third embodiment is similar to that of the first and second embodiments. The third embodiment is different from the first and second embodiments in that the leak check is performed on a replacement laser chamber 10d.

4.1 Replacement Laser Chamber

Figure 10:
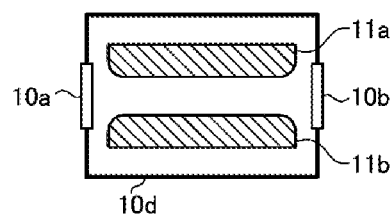
FIG. 10 schematically shows the configuration of a replacement laser chamber.

FIG. 10 schematically shows the configuration of the replacement laser chamber 10d. The replacement laser chamber 10d is similar to the laser chamber 10 in that the windows 10a, 10b are provided thereto and the electrodes 11a, 11b are accommodated. When the above-described maintenance operation includes replacement of the laser chamber 10, the laser chamber 10 is removed from the laser device 1, and the replacement laser chamber 10d shown in FIG. 10 is attached to the laser device 1.

4.2 Leak Check Procedure

Figure 11:
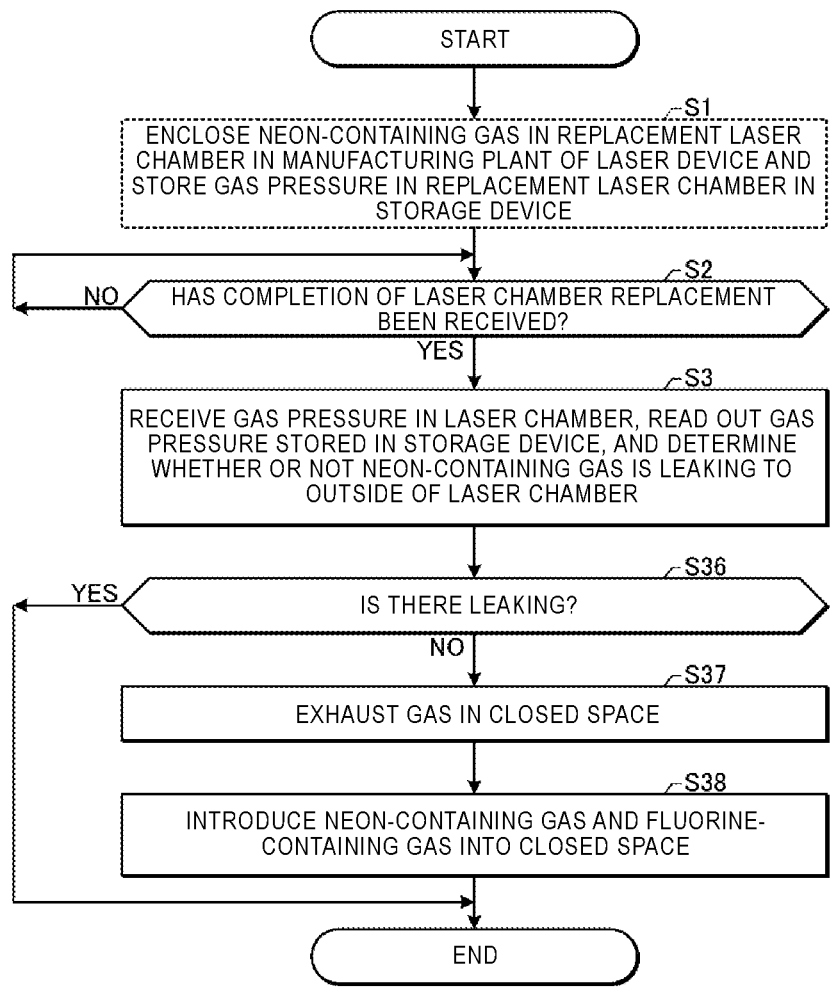
FIG. 11 is a flowchart showing the procedure of the leak check in a third embodiment.

FIG. 11 is a flowchart showing the procedure of the leak check in the third embodiment. The step surrounded by a broken line frame indicates the operation of a manufacturer of the laser device 1.

In S1, the manufacturer of the laser device 1 encloses neon-containing gas in the replacement laser chamber 10d in a manufacturing plant of the laser device 1, and causes a storage device (not shown) to store the gas pressure P1 in the replacement laser chamber 10d and the measurement time T1. The storage device may be, for example, a storage device attached to the replacement laser chamber 10d. Alternatively, the storage device may be a storage device accessible from the gas control unit 32 or the laser control unit 30 of the laser device 1 installed in a semiconductor manufacturing plant to which the laser device 1 is shipped.

The replacement laser chamber 10d is shipped to the semiconductor manufacturing plant and attached to the laser device 1 by laser chamber replacement operation of the laser device 1.

In S2, the gas control unit 32 determines whether or not a signal indicating the completion of the laser chamber replacement operation has been received. When the signal indicating the completion of the laser chamber replacement operation has not been received (S2: NO), the gas control unit 32 waits until the signal indicating the completion of the laser chamber replacement operation is received. When the signal indicating the completion of the laser chamber replacement operation has been received (S2: YES), the gas control unit 32 advances processing to S3.

In S3, the gas control unit 32 receives the gas pressure P2 in the laser chamber 10 measured by the pressure gauge P and the measurement time T2 from the laser control unit 30. The laser chamber 10 in this case is a replacement laser chamber 10d newly attached. The gas control unit 32 reads out the gas pressure P1 and the measurement time T1 stored in the storage device and calculates the following value $\Delta P$ or $dP/dT$.

$$\Delta P = |P1 - P2|$$

$$dP/dT = |P1 - P2|/(T2 - T1)$$

When $\Delta P$ is equal to or smaller than a predetermined threshold value or when $dP/dT$ is equal to or smaller than a predetermined threshold value, the gas control unit 32 determines that the neon-containing gas is not leaking to the outside of the laser chamber 10. When $\Delta P$ is larger than the predetermined threshold value or when $dP/dT$ is larger than the predetermined threshold value, the gas control unit 32 determines that the neon-containing gas is leaking to the outside of the laser chamber 10.

The processes of S36 and S38 are similar to the processes described with reference to FIG. 5. When the neon gas is leaking to the outside of the closed space (S36: YES) or after S38, the gas control unit 32 terminates processing of the present flowchart.

In other respects, the third embodiment is similar to the first or second embodiment.

4.3 Effect

According to the third embodiment, the leak check of the replacement laser chamber 10d is performed (S3 of FIG. 11), and then the fluorine-containing gas and the like is introduced (S38 of FIG. 11). Thus, since it is determined in advance that the neon gas is not leaking, it is possible to suppress the leakage of the fluorine gas from the replacement laser chamber 10d when the fluorine-containing gas or the like is introduced. Further, when the leak check is performed using the neon-containing gas, the number of times of repeating the exhaust in S37 and the gas introduction in S38 can be reduced as compared with the case in which the leak check is performed using helium gas.

5. Others

The description above is intended to be illustrative and the present disclosure is not limited thereto. Therefore, it would be obvious to those skilled in the art that various modifications to the embodiments of the present disclosure would be possible without departing from the spirit and the scope of the appended claims. Further, it would be also obvious to those skilled in the art that embodiments of the present disclosure would be appropriately combined.

The terms used throughout the present specification and the appended claims should be interpreted as non-limiting terms unless clearly described. For example, terms such as "comprise", "include", "have", and "contain" should not be interpreted to be exclusive of other structural elements. Further, indefinite articles "a/an" described in the present specification and the appended claims should be interpreted to mean "at least one" or "one or more." Further, "at least one of A, B, and C" should be interpreted to mean any of A, B, C, A+B, A+C, B+C, and A+B+C as well as to include combinations of any thereof and any other than A, B, and C.

What is claimed is:

1. A leak check method for a laser device, comprising:
   exposing a closed space accommodating laser medium gas to the atmosphere;
   isolating the closed space from the atmosphere after exposing the closed space to the atmosphere;
   introducing neon-containing gas containing neon gas to the closed space; and
   determining whether or not the neon gas is leaking to outside of the closed space using a leak detector having sensitivity to neon gas.

2. The leak check method according to claim 1, wherein the closed space includes a space inside a laser chamber.

3. The leak check method according to claim 1, further comprising: before the exposing to the atmosphere,
   exhausting gas in the closed space via a fluorine trap,
   introducing the neon-containing gas into the closed space, and
   exhausting again gas in the closed space via the fluorine trap.

4. The leak check method according to claim 1, wherein the determining is performed based on whether or not neon gas exceeding a threshold value is detected using the leak detector having sensitivity to neon gas.

5. The leak check method according to claim 1, wherein the determining is performed based on change in gas pressure in the closed space.

6. The leak check method according to claim 1, further comprising: when determined that neon gas is not leaking to the outside of the closed space,
   exhausting gas in the closed space, and
   introducing the neon-containing gas and fluorine-containing gas into the closed space.

7. A leak check method for a laser device, the laser device including a laser chamber, a first pipe configured to introduce first gas containing neon gas and fluorine gas into the laser chamber, and a second pipe configured to introduce second gas containing neon gas and having fluorine gas concentration lower than that of the first gas into the laser chamber, the leak check method comprising:
   introducing third gas containing neon gas and having fluorine gas concentration lower than that of the first gas into a closed space including a space inside the laser chamber; and determining whether or not neon gas is leaking to outside of the closed space using a leak detector having sensitivity to neon gas.

8. The leak check method according to claim 7, wherein the third gas is gas having the same composition as the second gas.

9. The leak check method according to claim 8, wherein the first pipe is connected to a first gas supply source storing the first gas, the second pipe is connected to a second gas supply source storing the second gas, and the third gas is introduced into the closed space from the second gas supply source.

10. The leak check method according to claim 7, wherein the laser device further includes a third pipe configured to introduce the third gas into the closed space.

11. The leak check method according to claim 7, wherein the laser device further includes a third pipe configured to introduce the third gas having the same composition as the second gas into the closed space.

12. The leak check method according to claim 11, wherein the first pipe is connected to a first gas supply source storing the first gas, and the second pipe and the third pipe are connected to a second gas supply source storing the second gas.

13. The leak check method according to claim 12, wherein a fourth pipe including a branch portion is connected to between the second pipe and the second gas supply source and to between the third pipe and the second gas supply source.

14. The leak check method according to claim 7, wherein the determining is performed based on whether or not neon gas exceeding a threshold value is detected using the leak detector having sensitivity to neon gas.

15. A laser device, comprising:
a laser chamber;
a first pipe connected to a first gas supply source storing first gas containing neon gas and fluorine gas so as to introduce the first gas into the laser chamber;
a second pipe connected to a second gas supply source storing second gas containing neon gas and having fluorine gas concentration lower than that of the first gas so as to introduce the second gas into the laser chamber; and
a third pipe connected to the second gas supply source so as to introduce the second gas into the laser chamber and the first pipe.

16. The laser device according to claim 15, wherein a fourth pipe including a branch portion is connected to between the second pipe and the second gas supply source and to between the third pipe and the second gas supply source.

17. The laser device according to claim 15, wherein the third pipe introduces the second gas into the laser chamber, the first pipe, and the second pipe.

18. The laser device according to claim 15, further comprising an exhaust device that exhausts gas from the laser chamber and the first pipe.

19. The laser device according to claim 15, further comprising an exhaust device that exhausts gas from the laser chamber, the first pipe, and the second pipe.

20. The laser device according to claim 15, wherein the first pipe includes a first connection portion at which the second pipe is connected to the first pipe and a second connection portion at which the third pipe is connected to the first pipe, the first connection portion and the second connection portion being separate from each other.

* * * * *